United States Patent
Han et al.

(10) Patent No.: US 7,320,168 B2
(45) Date of Patent: Jan. 22, 2008

(54) METHOD TO IMPROVE HEAT DISSIPATION IN A MAGNETIC SHIELD

(75) Inventors: Cherng-Chyi Han, San Jose, CA (US); Rod Lee, San Jose, CA (US); Mao-Min Chen, San Jose, CA (US); Pokang Wang, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 495 days.

(21) Appl. No.: 10/696,431

(22) Filed: Oct. 29, 2003

(65) Prior Publication Data

US 2005/0094319 A1     May 5, 2005

(51) Int. Cl.
   G11B 5/127     (2006.01)
   H04R 31/00    (2006.01)

(52) U.S. Cl. ............... 29/603.13; 29/603.11; 29/603.15; 29/603.16; 29/603.18; 360/235.2; 360/234.7; 360/319; 360/320

(58) Field of Classification Search ............ 29/603.07, 29/603.11, 603.13–603.16, 603.18; 360/235.2, 360/234.7, 319, 320
See application file for complete search history.

(56) References Cited

U.S. PATENT DOCUMENTS

| | | | | |
|---|---|---|---|---|
| 4,071,868 A | * | 1/1978 | Kaminaka et al. | 360/319 |
| 6,101,071 A | * | 8/2000 | Kouchiyama | 360/324 |
| 6,166,487 A | * | 12/2000 | Negishi et al. | 313/495 |
| 6,239,954 B1 | | 5/2001 | Segar et al. | 360/313 |
| 6,556,389 B1 | | 4/2003 | Boutaghou et al. | 360/320 |
| 2002/0081778 A1 | | 6/2002 | Inoue et al. | 438/122 |
| 2003/0048578 A1 | * | 3/2003 | Kikuchi et al. | 360/123 |

FOREIGN PATENT DOCUMENTS

JP     05266434 A     * 10/1993

* cited by examiner

*Primary Examiner*—Paul D. Kim
(74) *Attorney, Agent, or Firm*—Saile Ackerman LLC; Stephen B. Ackerman

(57) ABSTRACT

Problems such as thermal pole tip protrusion result from thermal mismatch between the alumina and pole material during the writing process. This, and similar problems due to inadequate heat dissipation, have been overcome by dividing the bottom shield into two pieces both of which sit on top of a non-magnetic heat sink. Heat generated by the coil during writing is transferred to the non-magnetic heat sink whence it gets transferred to the substrate. With this approach, the head not only benefits from less field disturbance due to the small shield but also improves heat dissipation from the additional heat sink.

4 Claims, 3 Drawing Sheets

METHOD TO IMPROVE HEAT DISSIPATION IN A MAGNETIC SHIELD

FIELD OF THE INVENTION

The invention relates to the general field of magnetic heads with particular reference to dissipating heat in accompanying magnetic shields.

BACKGROUND OF THE INVENTION

For high areal density magnetic recording, one of the requirements is to have lower fly height in order to have better signal to noise ratio for better head performance. However, there are many reliability problems associated with this low fly height. Problems such as thermal pole tip protrusion, resulting from thermal mismatch between the alumina and pole material during the writing process will create a head disk interface problem and eventually damage the read head.

One way to reduce thermal pole tip protrusion is to have a better heat dissipation mechanism so that heat generated by the coil during the writing process can be transferred to the substrate to avoid heat accumulation. On the other hand, it is required to have a small shield that only covers the read sensor (to reduce external field disturbance) in order to improve the overall reader performance. Thus there is a problem of how to make a small active shield have good heat dissipation.

A routine search of the prior art was performed with the following references of interest being found:

In U.S. Pat. No. 6,239,954 Segar et al. disclose a non-magnetic element over the bottom shield to detect and cancel thermal changes in the read head. In U.S. Pat. No. 6,556,389 Boutaghou et al. describe a thermal barrier of zirconia over the magnetic read head element to dissipate heat while Inoue et al. show a AIN heat sink over a bottom shield in US Patent 2002/0081778.

SUMMARY OF THE INVENTION

It has been an object of at least one embodiment of the present invention to provide a magnetic read-write head that is subject to minimum heating during operation.

Another object of at least one embodiment of the present invention has been to provide a magnetic read head that is minimally disturbed by external fields.

Still another object of at least one embodiment of the present invention has been to provide a process for manufacturing said read-write head.

These objects have been achieved by dividing the bottom shield into two pieces both of which sit on top of a non-magnetic heat sink. Heat generated by the coil during a writing process is transferred to the non-magnetic heat sink whence it gets transferred to the substrate. With this approach, the head not only benefits from less field disturbance due to the small shield but also improves heat dissipation from the additional heat sink

BRIEF DESCRIPTION OF THE DRAWINGS

FIG. 5 shows the completed device, including a double planar writer.

DESCRIPTION OF THE PREFERRED EMBODIMENTS

The present invention teaches a novel method to make a two-piece bottom shield with both pieces sitting on top of a non-magnetic metal heat sink. The heat generate by the coil during writing is transferred to the non-magnetic metal heat sink and hence transfers to the substrate. With this approach, the head not only benefits from less field disturbance (due to the small shield) but also receives improved the heat dissipation from the additional heat sink.

We will disclose the invention through a description of the process for manufacturing a read-write head that includes the key novel features of the invention, namely the split shield underlaid by a heat sink. Said process description will also serve to make clear the structure of the present invention.

Figure 1:
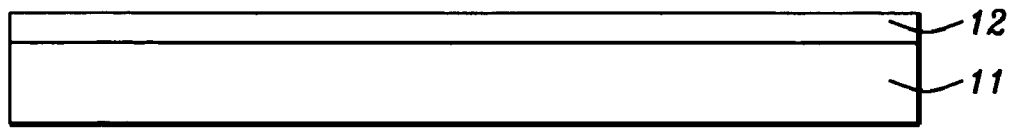
FIG. 1 shows the starting point for the process of the present invention.
Figure 2:
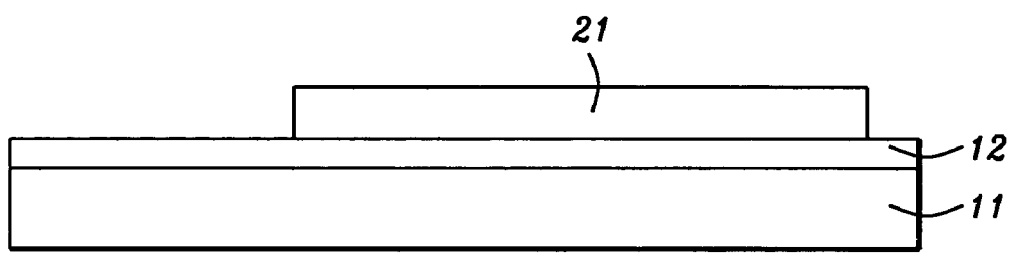
FIGS. 2 and 3 show the formation of the heat dissipating underlayer.

Referring now to FIG. 1, the process of the present invention begins with the provision of substrate 11 and then depositing thereon dielectric layer 12. Then layer of non-magnetic material 21, having a thermal conductivity greater than about 300 W/m.K, is deposited onto dielectric layer 12. Layer 21 is then patterned to reduce its area so that the upper surface of layer 12 is exposed on opposite sides of it, as illustrated in FIG. 2. Examples of materials suitable for layer 21 include (but are not limited to) copper and nickel-copper. It is deposited to a thickness between about 1 and 2 microns.

Figure 3:
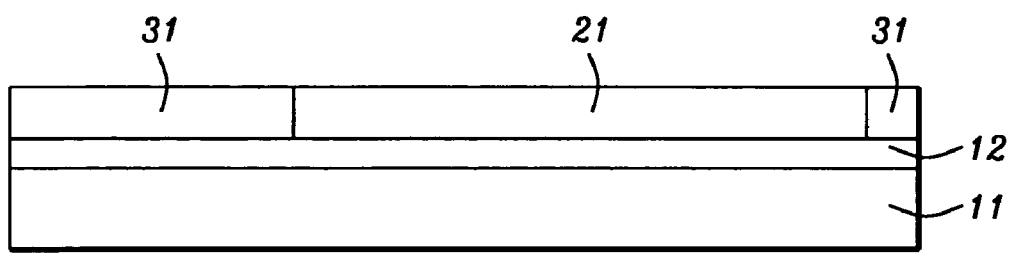
Figure 4:
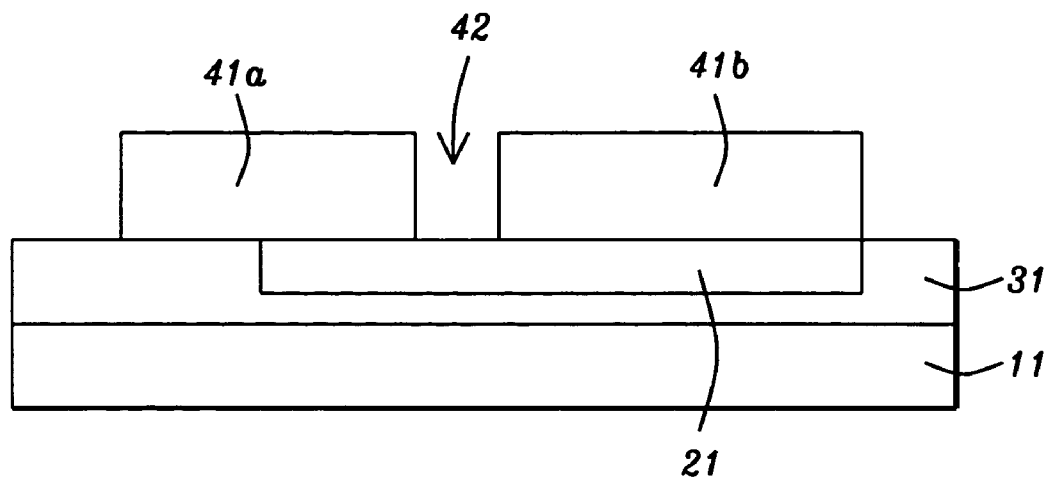
FIGS. 4 and 5 illustrate formation of the split magnetic shield.
Figure 5:
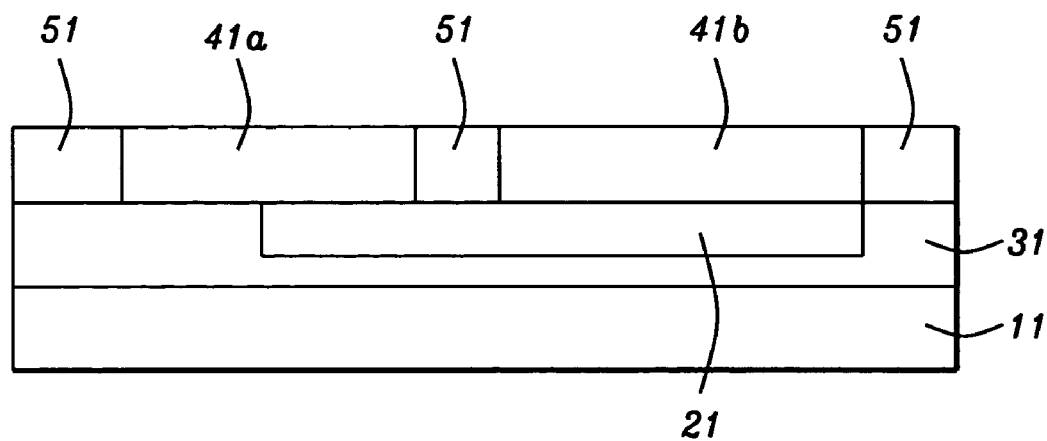

The structure is then fully covered with second dielectric layer 31, following which it is planarized until thermally conductive layer 21 is just exposed, as illustrated in FIG. 3.

Next, ferromagnetic layer 41 is deposited (to a thickness between about 1 and 3 microns) on the structure's upper surface and patterned to form coplanar, opposing magnetic shields 41a and 41b, separated by gap 42 that extends as far as the upper surface layer 21. Gap 42 is between about 4 and 10 microns wide.

Figure 6:
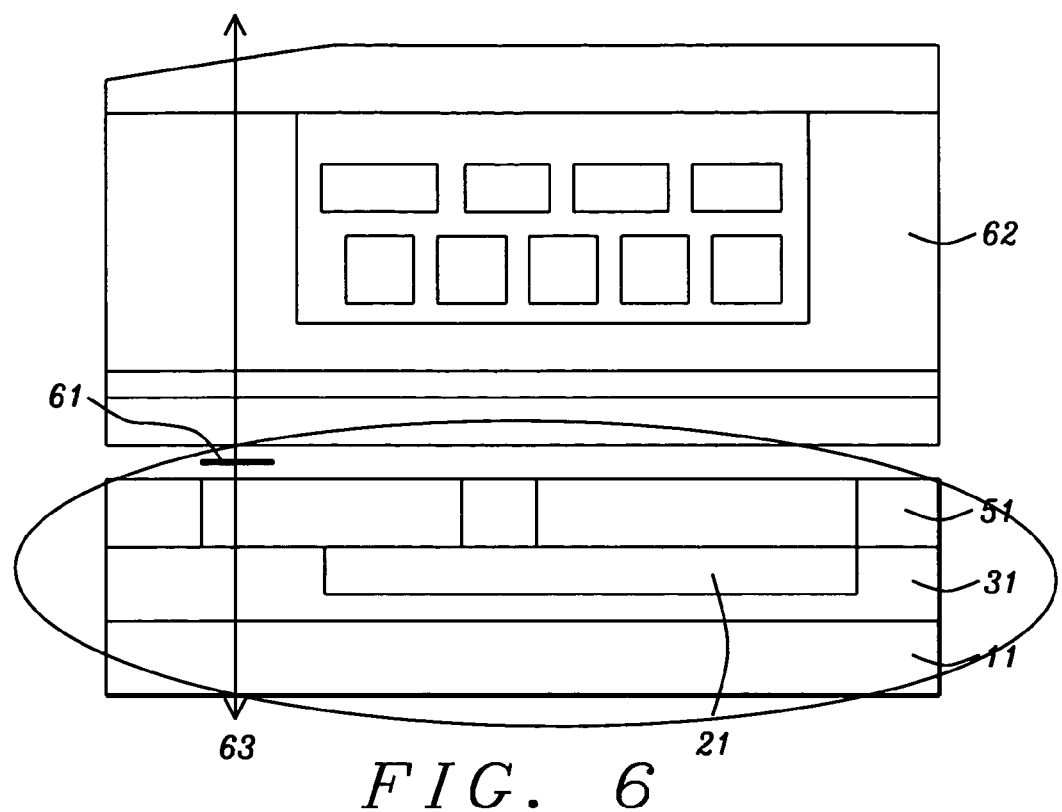
FIGS. 6 and 7 shows the completed device, exemplified as a double planar writer and a low DC resistance writer, respectively.
Figure 7:
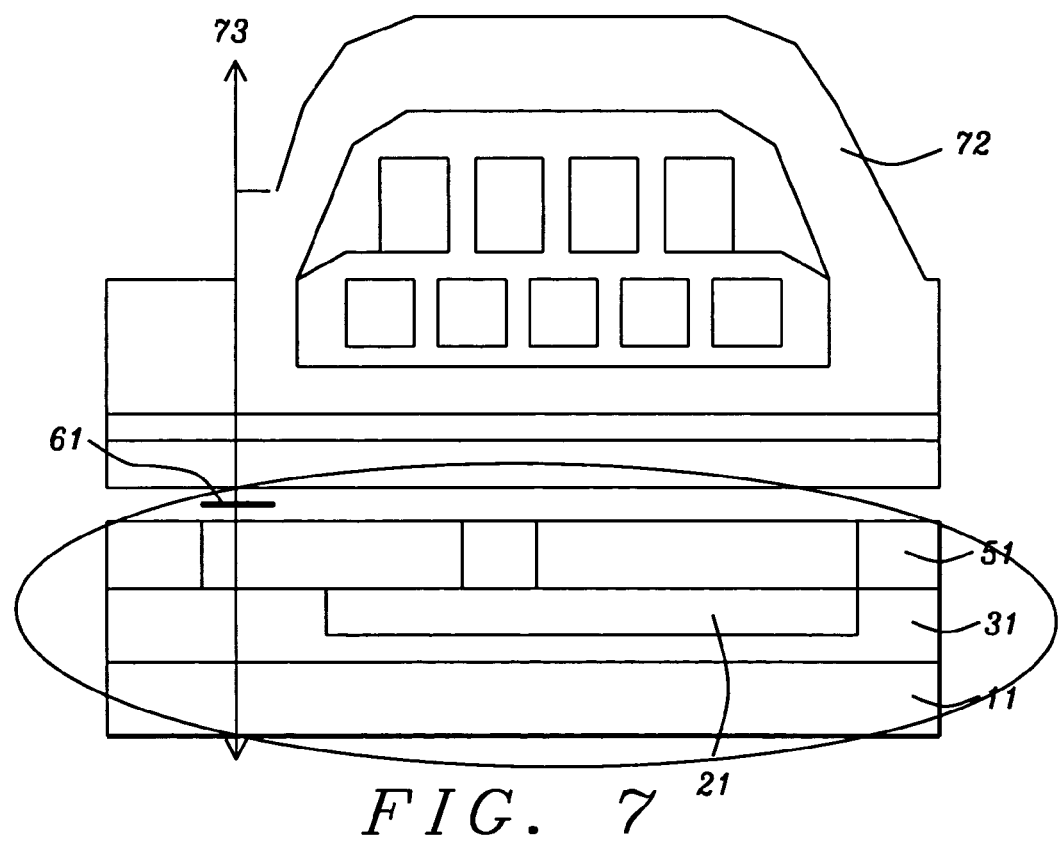

The structure is then fully covered with dielectric layer 51, following which it is planarized until magnetic shields 41a and 41b are just exposed. This completes formation of the lower magnetic shield for a full read-write head. Examples of these are shown in FIGS. 6 and 7. In both cases read head 61 (encapsulated in a dielectric medium) is seen directly above the lower shield. Magnetic read head 61 may be a CIP (current in plane) or a CPP (current perpendicular to plane) design.

Write head 62 is an example of a double planar writer while write head 72 is an example of a LDCR (low DC resistance) writer. In both cases manufacture of the full read-write head concludes by planarizing parallel to plane 63 or 73 to define the air bearing surface (ABS).

What is claimed is:

1. A method to improve heat dissipation in a magnetic shield, comprising:
   providing said shield in the form of a layer of ferromagnetic material on a substrate;
   inserting a layer of non-magnetic material, having a thermal conductivity greater than about 300 W/m.K, between said shield and said substrate; and
   splitting said shield into two coplanar opposing parts separated by a gap.

2. The method described in claim 1 wherein said thermally conductive layer of non-magnetic material is selected from the group consisting of Cu and NiCu.

3. The method described in claim 1 wherein said thermally conductive layer of non-magnetic material is deposited to a thickness between about 1 and 2 microns.

4. The method described in claim 1 wherein said gap separating said opposing shield parts is between about 4 and 10 microns wide.

* * * * *